US012715094B2

(12) United States Patent
Ootsuka

(10) Patent No.: US 12,715,094 B2
(45) Date of Patent: Aug. 25, 2026

(54) WORKING MACHINE

(71) Applicant: Koki Holdings Co., Ltd., Tokyo (JP)

(72) Inventor: Kazuhiro Ootsuka, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/841,515

(22) PCT Filed: Mar. 10, 2023

(86) PCT No.: PCT/JP2023/009232
§ 371 (c)(1),
(2) Date: Aug. 26, 2024

(87) PCT Pub. No.: WO2023/176711
PCT Pub. Date: Sep. 21, 2023

(65) Prior Publication Data

US 2025/0162118 A1 May 22, 2025

(30) Foreign Application Priority Data

Mar. 16, 2022 (JP) ................................ 2022-041236

(51) Int. Cl.
*B25C 1/06* (2006.01)
*B25C 1/00* (2006.01)
*B25C 1/04* (2006.01)

(52) U.S. Cl.
CPC ................ *B25C 1/06* (2013.01); *B25C 1/008* (2013.01)

(58) Field of Classification Search
CPC .................................. B25C 1/06; B25C 1/047
(Continued)

(56) References Cited

U.S. PATENT DOCUMENTS 4,091,981 A * 5/1978 Moriguchi .............. B25C 1/044 227/8
4,807,793 A * 2/1989 Ghibely .................... B25C 1/06 227/8

(Continued)

FOREIGN PATENT DOCUMENTS

EP 3730248 A1 10/2020
JP 2014-069289 A 4/2014

(Continued)

OTHER PUBLICATIONS

International Search Report (with English translation) and Written Opinion dated May 9, 2023, from corresponding International Application No. PCT/JP2023/009232, 8 pages.

*Primary Examiner* — Praachi M Pathak
(74) *Attorney, Agent, or Firm* — RIMON P.C.

(57) ABSTRACT

A driving device includes an electric motor, a striking unit configured to strike a fastener by moving to a lower side in an up-down direction, a biasing unit configured to bias the striking unit to the lower side in the up-down direction, and a rotating unit configured to move the striking unit to an upper side in the up-down direction and including first to third gears. The rotating unit includes a wheel and a plurality of engaging portions provided so as to be engageable with the striking unit, and the plurality of engaging portions include a second pin and a third pin that are engaged with the striking unit when the striking unit is moved to the upper side in the up-down direction and a stopper pin that is not engaged with the striking unit when the striking unit is moved to the upper side in the up-down direction.

10 Claims, 15 Drawing Sheets

(58) Field of Classification Search
USPC .......................................... 227/140, 9, 137
See application file for complete search history.

(56) References Cited

U.S. PATENT DOCUMENTS

| | | | | |
|---|---|---|---|---|
| 10,843,317 | B2 * | 11/2020 | Sato | B25C 7/00 |
| 11,648,653 | B2 * | 5/2023 | Baba | B25C 1/047 227/10 |
| 11,759,928 | B2 * | 9/2023 | Kuriki | B25C 1/008 227/130 |
| 2005/0082334 | A1 * | 4/2005 | Hu | B25C 1/06 227/132 |
| 2015/0202755 | A1 | 7/2015 | Tanji | |
| 2016/0288305 | A1 * | 10/2016 | McCardle | B25C 1/06 |
| 2017/0190037 | A1 * | 7/2017 | Sato | B25C 1/06 |
| 2020/0338708 | A1 * | 10/2020 | Po | B25C 1/047 |
| 2022/0126431 | A1 * | 4/2022 | Ootsuka | B25C 1/06 |
| 2023/0025226 | A1 * | 1/2023 | Aizawa | B25C 1/04 |
| 2024/0139922 | A1 * | 5/2024 | Kawamata | B25C 1/04 |

FOREIGN PATENT DOCUMENTS

| | | | |
|---|---|---|---|
| JP | 2018-039064 | A | 3/2018 |
| JP | 2020-019078 | A | 2/2020 |
| WO | 2011/010512 | A1 | 1/2011 |

* cited by examiner

WORKING MACHINE

CROSS-REFERENCE TO RELATED APPLICATIONS

This application is the U.S. National Phase under 35 U.S.C. § 371 of International Application No. PCT/JP2023/009232, filed on Mar. 10, 2023, which claims the benefit of foreign priority to Japan Patent Application No. 2022-041236 filed on Mar. 16, 2022, the entire contents of each of which are hereby incorporated by reference.

TECHNICAL FIELD

The present invention relates to a working machine such as a driving device.

BACKGROUND ART

As an example of a working machine, a driving device including a motor, a striking unit capable of striking a fastener, and a rotating unit rotated by a driving force of the motor is known.

As such a driving device described above, for example, Patent Document 1 discloses a driving device having a structure in which a pin wheel is provided as a component member of a rotating unit, a plunger is provided as a striking unit, and the plunger is wound up by engaging a pin provided on the pin wheel with the plunger.

RELATED ART DOCUMENTS

Patent Documents

Patent Document 1: Japanese Unexamined Patent Application Publication No. 2020-19078

SUMMARY OF THE INVENTION

Problems to Be Solved by the Invention

In the driving device described in Patent Document 1 mentioned above, there is a concern of the occurrence of idling strike in which the plunger accidentally moves to the bottom dead center due to breakage or the like of the pin provided on the pin wheel. Since the occurrence of the idling strike may lead to breakage of the plunger, improvement of the durability of the driving device has been desired.

An object of the present invention is to provide a working machine with improved durability.

Means for Solving the Problems

A working machine according to the present invention includes: a driving source; a striking unit configured to be able to strike a fastener by moving to one side in a first direction; a biasing unit configured to bias the striking unit to the one side in the first direction; and a rotating unit configured to be rotated by a driving force of the driving source, thereby moving the striking unit to the other side in the first direction, the rotating unit includes a base unit and a plurality of engaging portions provided on the base unit so as to be engageable with the striking unit, and the plurality of engaging portions include: a first engaging portion that is engaged with the striking unit when the striking unit is moved to the other side in the first direction; and a second engaging portion that is not engaged with the striking unit when the striking unit is moved to the other side in the first direction.

Effects of the Invention

According to the present invention, durability of a working machine can be improved.

BRIEF DESCRIPTIONS OF THE DRAWINGS

DETAILED DESCRIPTION OF PREFERRED EMBODIMENTS

Figure 1:
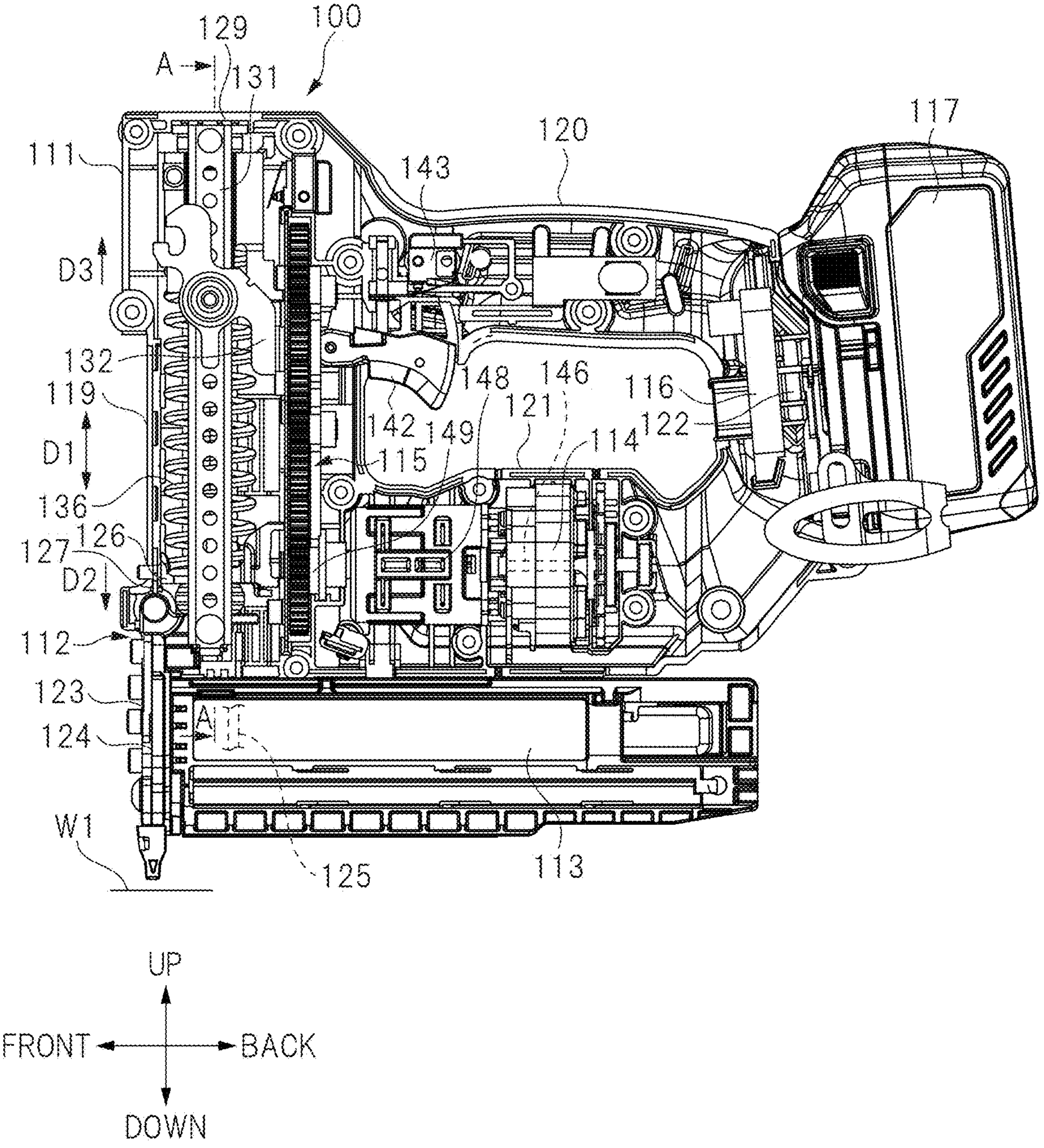
FIG. 1 is a side cross-sectional view illustrating a structure of a working machine according to an embodiment of the present invention.

Hereinbelow, an example of an embodiment of the present invention will be described in detail with reference to the drawings.

In the present embodiment, a coil spring type driving device will be described as an example of a working machine. A driving device 100 illustrated in FIG. 1 to FIG. 4 includes a housing 111, a striking unit 112, a magazine 113, an electric motor (driving source) 114, a transmission mechanism (winding mechanism) 115, a control unit 116, a battery pack 117, and a counterweight 118. The housing 111 includes a cylindrical body 119, a handle 120 connected to the body 119, and a motor case 121 connected to the body 119. An attaching unit 122 is connected to the handle 120 and the motor case 121. The battery pack 117 is attached to the attaching unit 122. In addition, an injection unit 123 including an injection path 124 is provided at the tip of the body 119, and the injection unit 123 supports a fastener 125 to be struck by the striking unit 112. The injection unit 123 is fixed to the body 119, and a worker can grip the handle 120 by hand and press the tip of the injection unit 123 to a workpiece W1.

The motor case 121 is disposed between the handle 120 and the magazine 113 in the direction of a center line E1. The magazine 113 is a unit in which a plurality of fasteners 125 are stored. The fastener 125 includes a nail and has a rod shape. The magazine 113 includes a feeder, and the feeder feeds the fastener 125 stored in the magazine 113 to the injection path 124.

The striking unit 112 is a member provided across the inside and outside of the body 119 and capable of striking the fastener 125 by moving to one side (lower side) in an up-down direction (first direction) D1. Specifically, the striking unit 112 includes a plunger 126 disposed in the body 119 and a driver blade 127 attached to the plunger 126. The driver blade 127 is a member for driving the fastener 125 and is made of metal. The plunger 126 to which the driver blade 127 is attached is made of metal or a synthetic resin.

Figure 4:
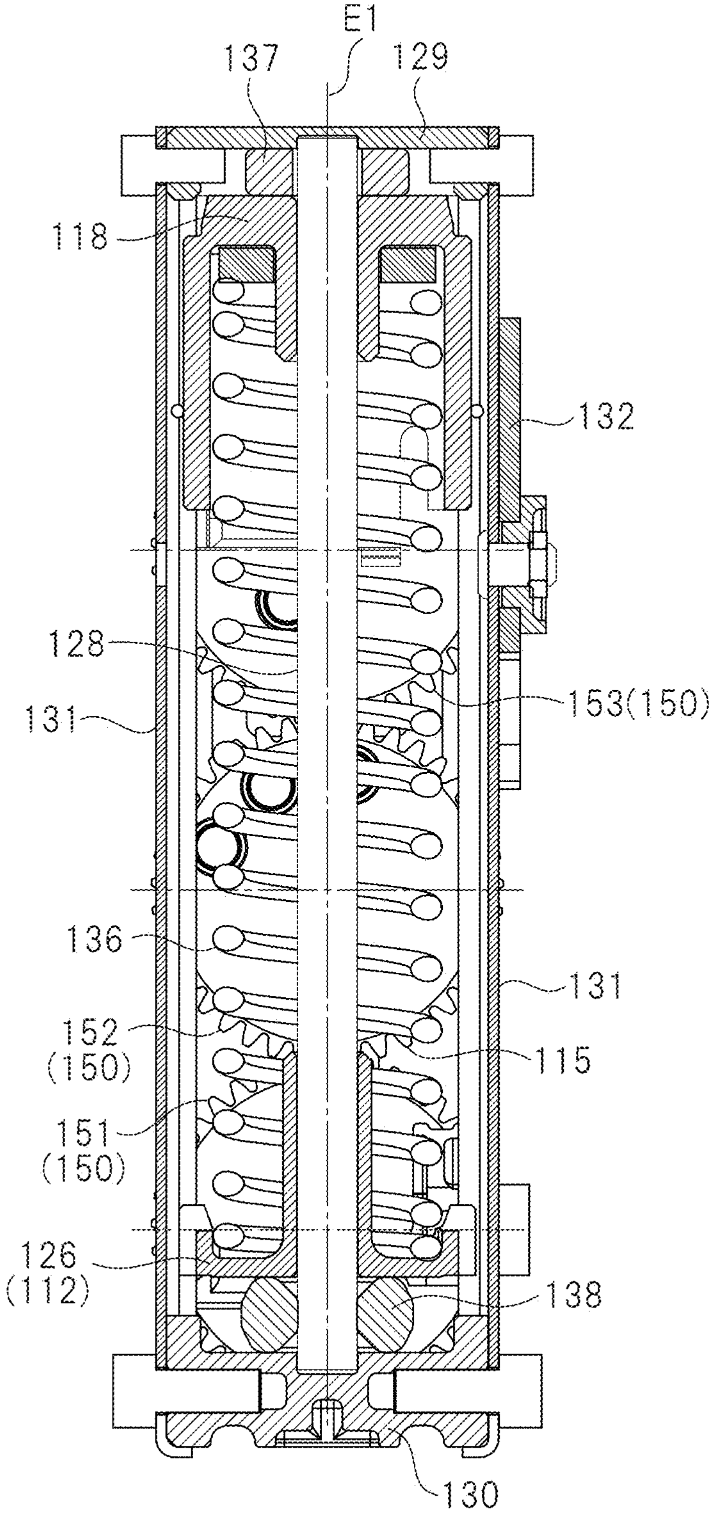
FIG. 4 is a cross-sectional view illustrating the structure of the working machine illustrated in FIG. 1 taken along the line A-A.

In the body 119, a guide shaft 128 illustrated in FIG. 4 is provided. The center line E1 passes through the center of the guide shaft 128. The guide shaft 128 is fixed to a top cover 129 and a bottom holder 130.

As illustrated in FIG. 1, the driving device 100 includes, as described above, the electric motor 114, the striking unit 112 that is driven by the driving force of the electric motor 114, strikes the fastener 125, and reciprocates in the up-down direction D1, and the housing 111 that houses the electric motor 114 and the striking unit 112 therein. Here, the up-down direction D1 includes a striking direction D2 in which the striking unit 112 strikes the fastener 125 and a return direction D3 which is a direction opposite to the striking direction D2. Namely, when the striking unit 112 strikes the fastener 125, the striking unit 112 moves to one side (lower side) in the up-down direction D1, and when the striking unit 112 returns, the striking unit 112 moves to the other side (upper side) in the up-down direction D1.

Figure 2:
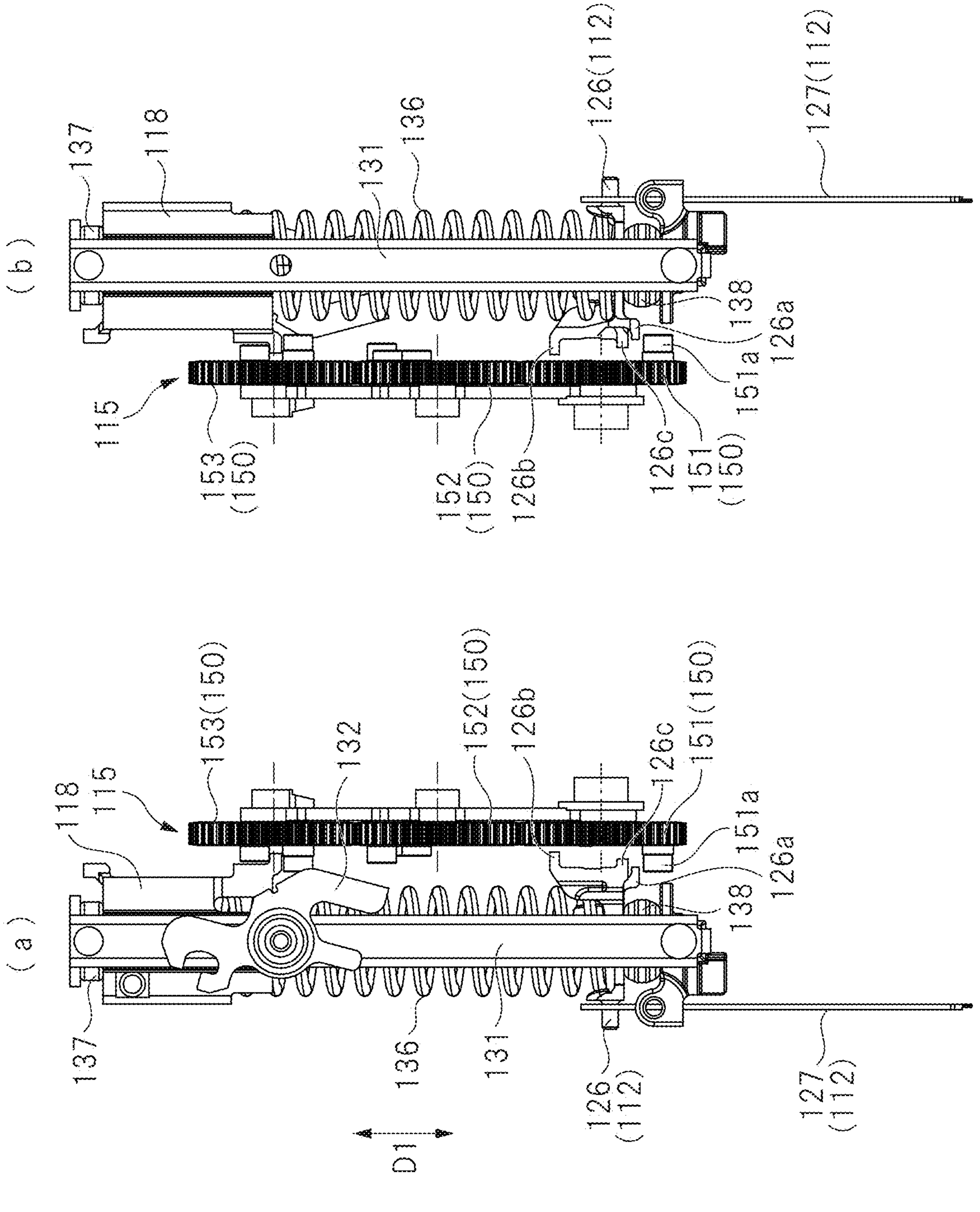
FIG. 2 is a diagram illustrating a structure of a winding mechanism of the working machine illustrated in FIG. 1, in which (a) is a left side view and (b) is a right side view.

In addition, a coiled spring (biasing unit) 136 that can expand and contract in the up-down direction D1 and biases the striking unit 112 toward one side (lower side) in the up-down direction D1 and the plunger 126 that abuts on the end portion of the spring 136 in the striking direction D2 and can strike the fastener 125 are provided in the body 119. Specifically, the plunger 126, the spring 136, the guide shaft 128, and the counterweight 118 that abuts on the end portion of the spring 136 in the return direction D3 are provided in the body 119 of the housing 111. Furthermore, the transmission mechanism 115 that is driven by the driving force of the electric motor 114, biases the plunger 126 toward the end portion of the spring 136 in the return direction D3, and biases the counterweight 118 toward the end portion of the spring 136 in the striking direction D2 to compress the spring 136 is provided in the body 119. Here, the transmission mechanism 115 includes, for example, a first gear 151, a second gear 152, and a third gear 153 illustrated in FIG. 2 and FIG. 3. Each of the first gear 151, the second gear 152, and the third gear 153 is provided with a pin, and is a rotating unit referred to also as a pin wheel. Namely, the rotating unit includes a wheel 150 serving as a base unit and a plurality of engaging portions provided on the wheel 150 so as to be engageable with the striking unit 112. The first gear 151, the second gear 152, and the third gear 153 are rotated by the driving force of the electric motor 114 to move the striking unit 112 to the other side (upper side) in the up-down direction D1. The transmission mechanism 115 is supported at both sides by a guide bar 131. In other words, the movement of the striking unit 112 is guided by the guide bar 131. As illustrated in FIG. 2, a latch 132 that restricts the movement of the counterweight 118 is rotatably attached to the guide bar 131. Note that a weight bumper 137 on which the counterweight 118 released from the biasing force of the transmission mechanism 115 can abut and a plunger bumper 138 on which the plunger 126 can abut are provided in the body 119 as illustrated in FIG. 4.

Next, the function and operation of each member related to the striking of the fastener 125 in the driving device 100 will be described in detail.

Figure 3:
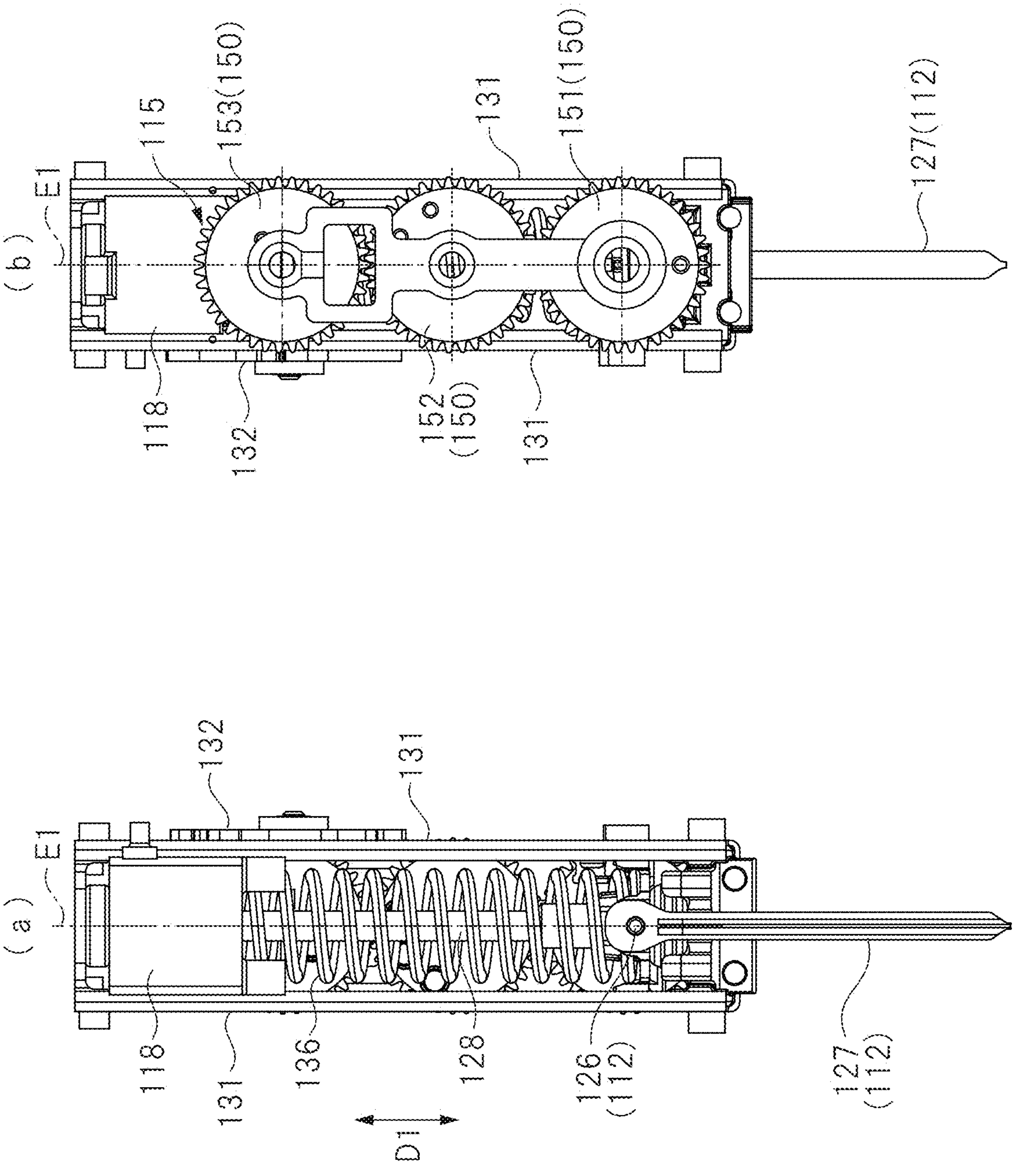
FIG. 3 is a diagram illustrating the structure of the winding mechanism illustrated in FIG. 2, in which (a) is a front view and (b) is a back view.

As illustrated in FIG. 4, the plunger 126 is attached to the outer peripheral surface of the guide shaft 128 and is operable in the direction of the center line E1 along the guide shaft 128. The guide shaft 128 positions the plunger 126 in the radial direction about the center line E1. The driver blade 127 illustrated in FIG. 3 is operable in parallel to the center line E1 together with the plunger 126. The driver blade 127 is operable in the injection path 124 illustrated in FIG. 1.

The counterweight 118 is a member that suppresses reaction received by the housing 111, and is attached to the guide shaft 128. The counterweight 118 is operable along the guide shaft 128 in the direction of the center line E1. The guide shaft 128 positions the counterweight 118 in the radial direction about the center line E1.

In addition, the spring 136 is provided in the body 119 as described above, and the spring 136 is disposed between the plunger 126 and the counterweight 118 in the direction of the center line E1. As an example, a compression coil spring in which a metal wire is spirally wound can be used as the spring 136. The spring 136 can expand and contract in the direction of the center line E1. An end portion of the spring 136 on the side provided with the bottom holder 130 in the direction of the center line E1 comes into direct or indirect contact with the plunger 126.

On the other hand, an end portion of the spring 136 on the side provided with the top cover 129 in the direction of the center line E1 comes into direct or indirect contact with the counterweight 118. The spring 136 receives a compressive force in the direction of the center line E1 and accumulates elastic energy. Note that the spring 136 is an example of a biasing mechanism that biases the striking unit 112 and the counterweight 118.

The plunger 126 receives, from the spring 136, a biasing force in the striking direction D2 approaching the bottom holder 130 in the direction of the center line E1. The counterweight 118 receives, from the spring 136, a biasing force in the return direction D3 approaching the top cover 129 in the direction of the center line E1. The striking direction D2 and the return direction D3 are opposite to each other, and the striking direction D2 and the return direction D3 are parallel to the center line E1. The plunger 126 and the counterweight 118 receive a biasing force from physically the same element, that is, the spring 136.

In addition, as illustrated in FIG. 4, the weight bumper 137 and the plunger bumper 138 are provided in the body 119. The weight bumper 137 is disposed between the top cover 129 and the counterweight 118. The plunger bumper 138 is disposed between the bottom holder 130 and the plunger 126. The weight bumper 137 and the plunger bumper 138 are both made of synthetic rubber.

The battery pack 117 in the driving device 100 illustrated in FIG. 1 is attachable to and detachable from the attaching unit 122. The battery pack 117 is a DC power supply, and the electric power of the battery pack 117 can be supplied to the electric motor 114. Namely, the electric motor 114 is driven by the electric power of the battery pack 117. In addition, the control unit 116 of the driving device 100 is provided in the attaching unit 122.

In the driving device 100, a trigger (operation unit) 142 and a trigger switch 143 are provided on the handle 120. The trigger 142 is operated by the worker. When the worker applies an operating force to the trigger 142, the trigger switch 143 is turned on. When the worker releases the operating force applied to the trigger 142, the trigger switch 143 is turned off.

The electric motor 114 includes a rotor and a stator (not illustrated), and a motor shaft 146 is attached to the rotor. When electric power is supplied from the battery pack 117, the motor shaft 146 of the electric motor 114 rotates. Also, a decelerator (not illustrated) disposed in the motor case 121 includes a plurality of sets of planetary gear mechanisms, an input element 148, and an output element 149. The input element 148 is connected to the motor shaft 146. The transmission mechanism 115 converts the rotational force of the output element 149 into the operating force of the striking unit 112 and the operating force of the counterweight 118.

Figure 5:
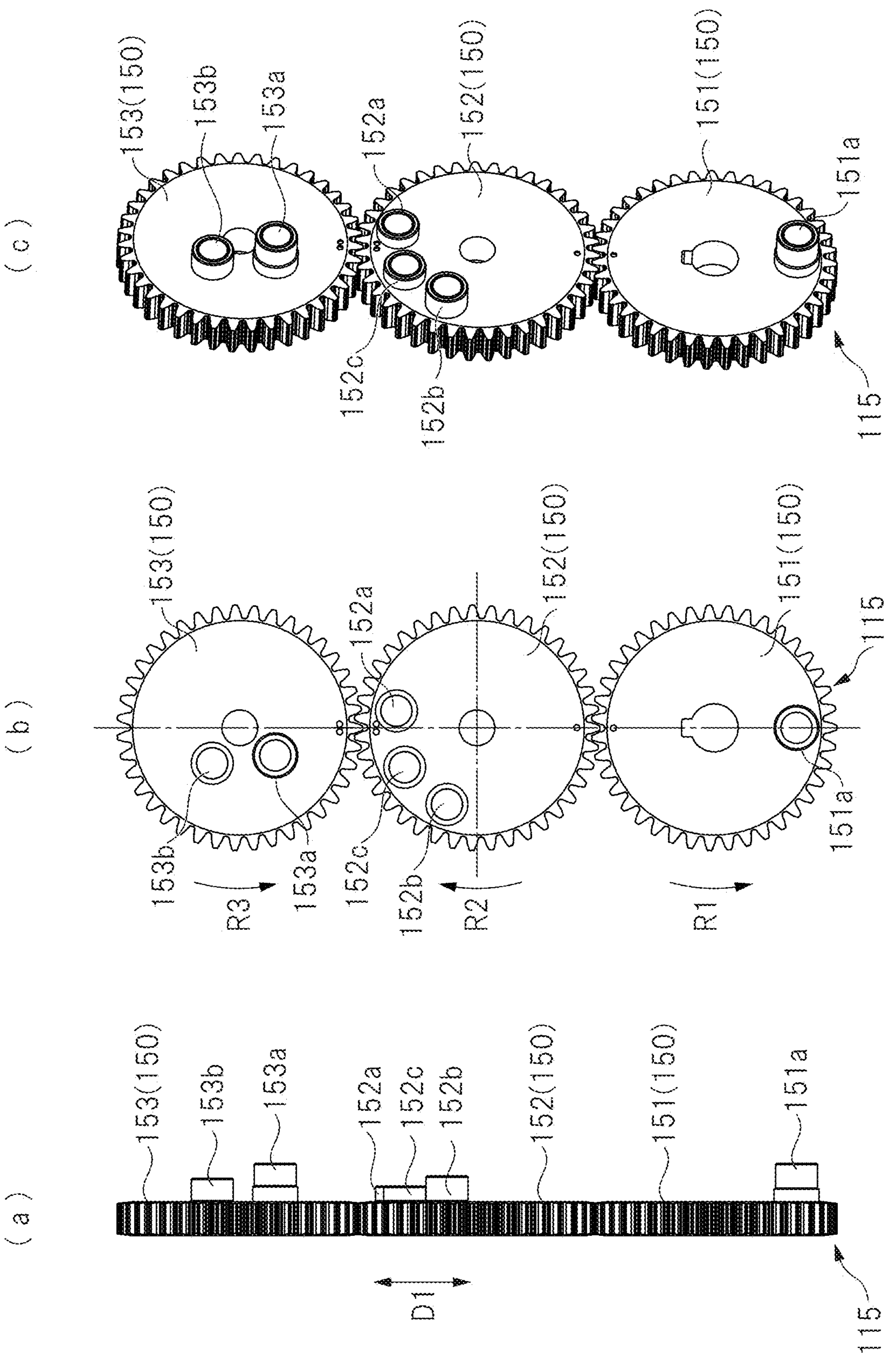
FIG. 5 is a diagram illustrating a meshing structure of gears provided in the winding mechanism illustrated in FIG. 2, in which (a) is a side view, (b) is a front view, and (c) is a perspective view.

Next, the structure and operation of the transmission mechanism 115 serving as a winding mechanism provided in the driving device 100 will be described in detail. As illustrated in FIG. 5(*a*), FIG. 5(*b*), and FIG. 5(*c*), the transmission mechanism 115 includes the first gear 151, the second gear 152, and the third gear 153. The outside diameter of the first gear 151, the outside diameter of the second gear 152, and the outside diameter of the third gear 153 are the same. The second gear 152 meshes with the first gear 151 and the third gear 153. Therefore, when the first gear 151 rotates in a rotating direction R1 by the driving force of the electric motor 114, the second gear 152 rotates in a rotating direction R2. Further, when the second gear 152 rotates in the rotating direction R2, the third gear 153 rotates in a rotating direction R3.

Further, the first gear 151 is provided with a first pin 151*a*, the second gear 152 is provided with a second pin (first engaging portion, second protruding portion) 152*a* and a third pin (first engaging portion, first protruding portion) 152*b*, and the third gear 153 is provided with a fourth pin 153*a* and a fifth pin 153*b* that are engageable with the counterweight 118. These pins are referred to also as cam rollers. Note that the second pin 152*a* and the third pin 152*b* are different pins, and the third pin 152*b* is longer (has a larger protrusion amount) than the second pin 152*a*. Further, the second gear 152 is provided with a stopper pin (second engaging portion) 152*c*. The stopper pin 152*c* is a pin having the same shape as the second pin 152*a*. Namely, the stopper pin 152*c* and the second pin 152*a* are pins having the same length (protrusion amount). Also, in the second gear 152, the second pin 152*a*, the third pin 152*b*, and the stopper pin 152*c* are disposed on the same circumference. The stopper pin 152*c* is disposed on the rear side of the second pin 152*a* in the rotating direction R2 of the second gear 152. Further, the stopper pin 152*c* is disposed at a position between the second pin 152*a* and the third pin 152*b* in the rotating direction R2 of the second gear 152. In the third gear 153, the fourth pin 153*a* and the fifth pin 153*b* are also disposed on the same circumference. Each pin is provided so as to be rotatable with respect to each gear.

Also, as illustrated in FIG. 6 to FIG. 13, the plunger 126 includes a first rack 126*a* engageable with the first pin 151*a* of the first gear 151 and a second rack (first engaged portion) 126*b* engageable with the second pin 152*a* of the second gear 152. Further, the plunger 126 also includes a third rack (second engaged portion) 126*c* engageable with the third pin 152*b* of the second gear 152.

Figure 14:
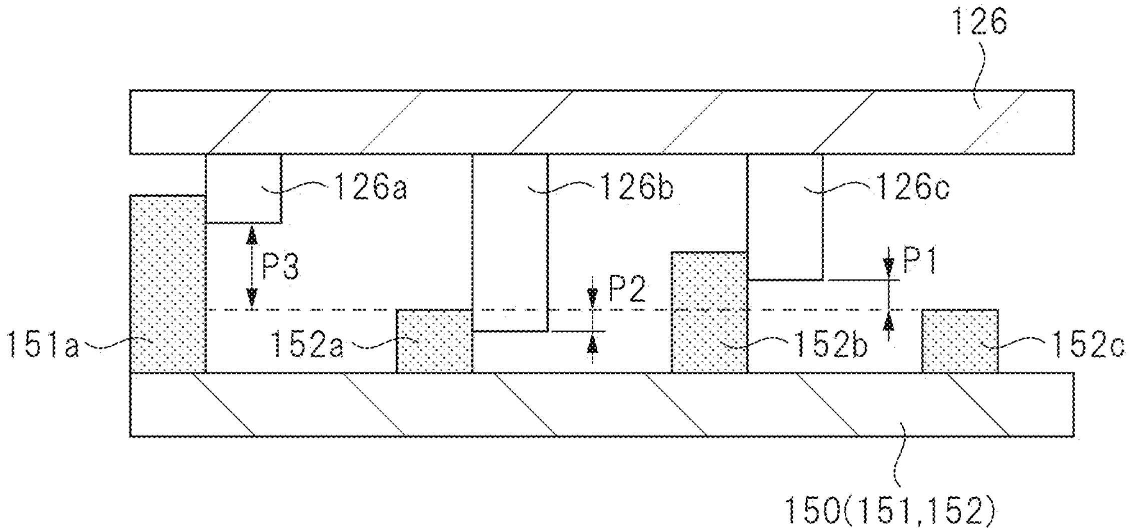
FIG. 14 is a schematic view illustrating protrusion amounts of racks of the plunger and pins of the gear in the winding mechanism illustrated in FIG. 2.

As illustrated in FIG. 14, since the second pin 152*a* and the stopper pin 152*c* are made of pins having the same shape, the protrusion amounts of the second pin 152*a* and the stopper pin 152*c* from the second gear 152 are the same. Further, since the second pin 152*a* is engageable with the second rack 126*b* of the plunger 126, the stopper pin 152*c* is also engageable with the second rack 126*b* (portion P2). Also, since both the second pin 152*a* and the stopper pin 152*c* are short pins, the second pin 152*a* and the stopper pin 152*c* are not engaged with the first rack 126*a* and the third rack 126*c* of the plunger 126 (portion P1 and portion P3). Namely, the stopper pin 152*c* is disposed so as not to be engaged with the first rack 126*a* and the third rack 126*c* in the normal winding operation (operation of moving the striking unit 112 to the upper side in the up-down direction D1) of the transmission mechanism 115 and so as not to be also engaged with the second rack 126*b* at the time of the normal winding operation. In other words, the stopper pin 152*c* is not engaged with any rack in the normal winding operation, and the normal winding operation is not hindered by the stopper pin 152*c*.

As described above, the driving device 100 according to the present embodiment includes, as the plurality of pins (engaging portions) provided on the respective gears of the transmission mechanism 115, the second pin 152*a* and the third pin 152*b* that are engaged with the striking unit 112 when the striking unit 112 is moved to the upper side in the up-down direction D1 and the stopper pin 152*c* that is not engaged with the striking unit 112 when the striking unit 112 is moved to the upper side in the up-down direction D1. Namely, the stopper pin 152*c* is a pin that is engaged with the second rack 126*b* of the plunger 126 when the second pin 152*a* and the third pin 152*b* are disengaged from the plunger 126 and the plunger 126 moves to the lower side in the up-down direction D1.

Figure 11:
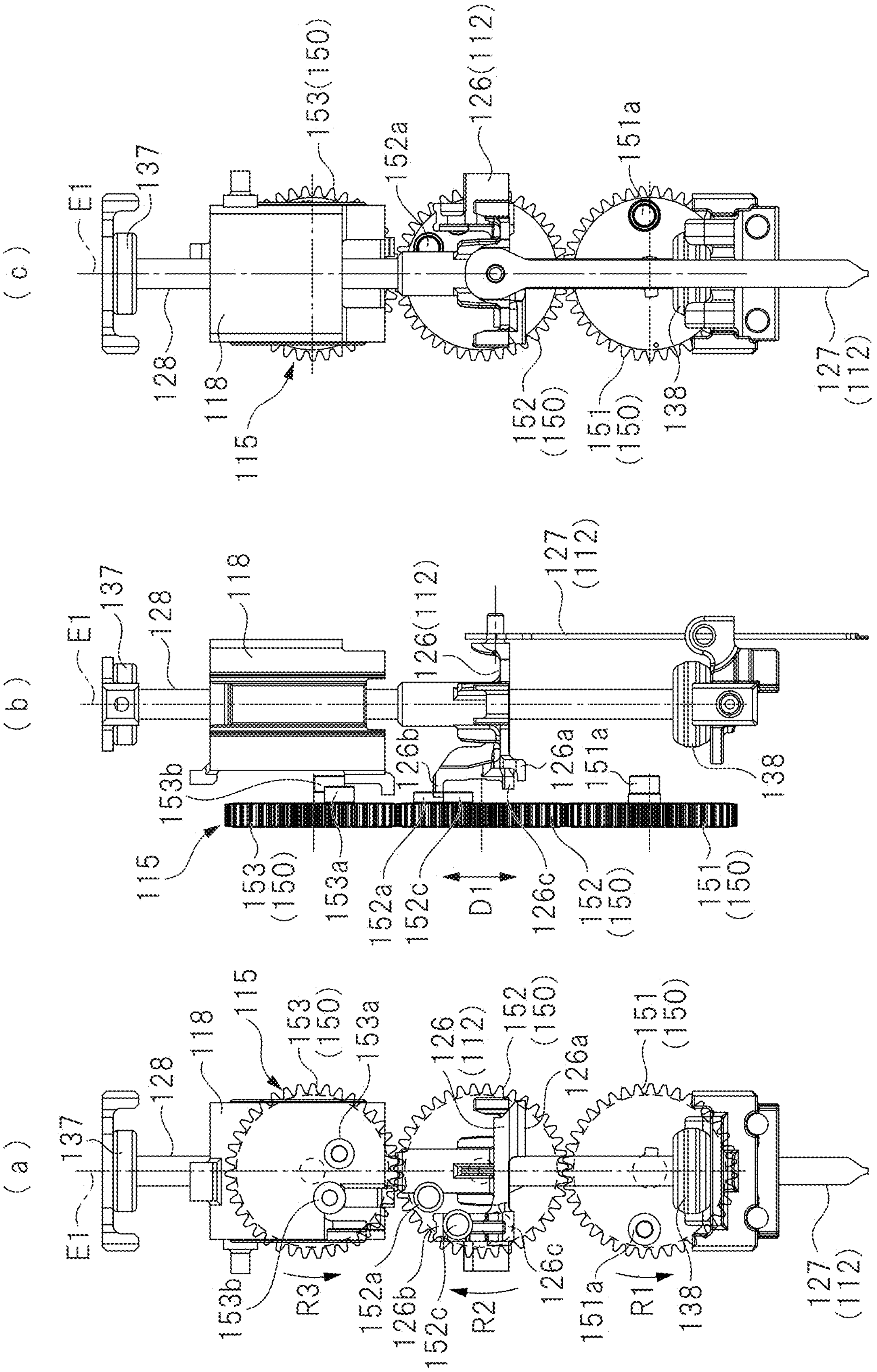
FIG. 11 is a diagram illustrating a state where a plunger is supported by a second engaging portion when the plunger is lowered from the state illustrated in FIG. 9, in which (a) is a back view, (b) is a right side view, and (c) is a front view.
Figure 12:
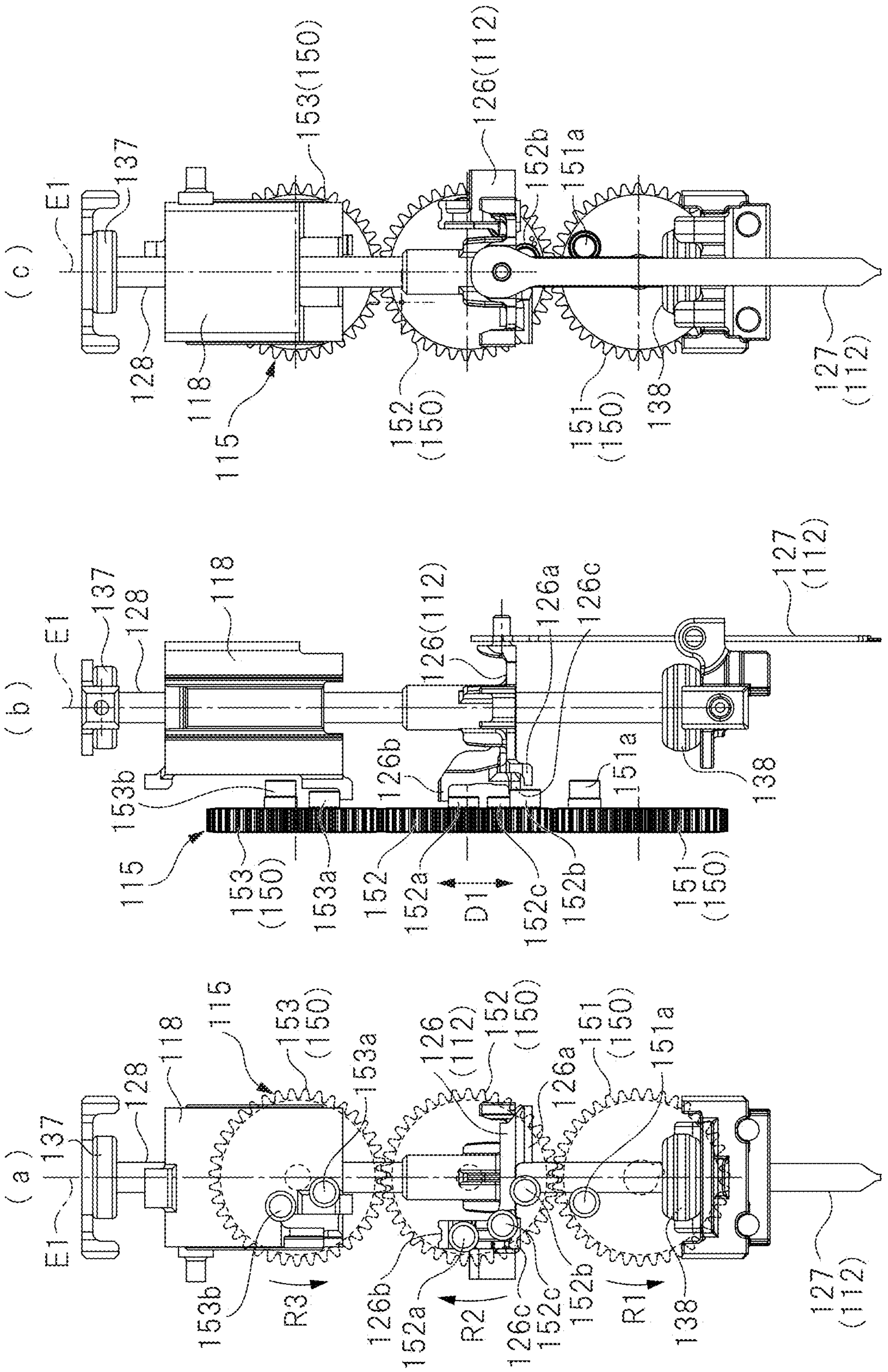
FIG. 12 is a diagram illustrating a state where the plunger is pushed up by a second protruding portion in the winding mechanism illustrated in FIG. 2, in which (a) is a back view, (b) is a right side view, and (c) is a front view.
Figure 13:
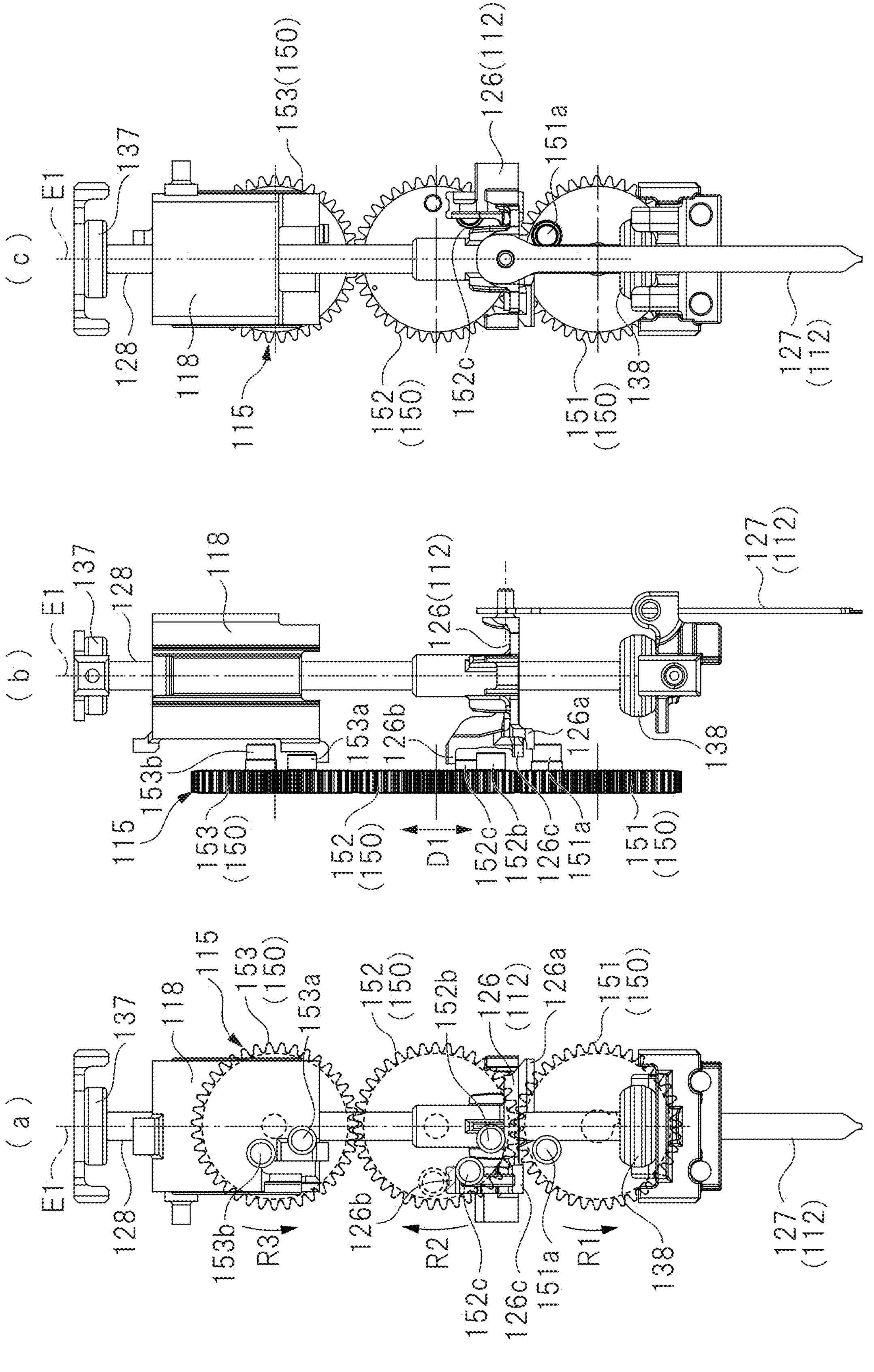
FIG. 13 is a diagram illustrating a state where the plunger is supported by the second engaging portion when the plunger is lowered from the state illustrated in FIG. 12, in which (a) is a back view, (b) is a right side view, and (c) is a front view.

Here, a situation where the stopper pin 152*c* and the second rack 126*b* of the plunger 126 are engaged with each other will be described. The plunger 126 is engaged with the third pin 152*b* in a standby state (standby state illustrated in FIG. 9) in which the trigger 142 is not operated. Namely, the plunger 126 is supported by the third pin 152*b* in the standby state in which the trigger 142 is not operated. At this time, a standby position at which the striking unit 112 is disposed in the standby state is a position between the top dead center position and the bottom dead center position in the movement of the striking unit 112 in the up-down direction D1. In the standby state at this standby position, for example, when the plunger 126 is lowered due to breakage or the like of the third pin 152*b*, the stopper pin 152*c* is engaged with the second rack 126*b* of the plunger 126 to stop the lowering of the plunger 126 as illustrated in FIG. 11. Namely, when the plunger 126 is lowered due to breakage or the like of the third pin 152*b* in the standby state, the second rack 126*b* of the plunger 126 and the stopper pin 152*c* are engaged with each other, and the second rack 126*b* of the plunger 126 gets caught on the stopper pin 152*c*. In this way, it is possible to prevent the plunger 126 from falling. Alternatively, when the plunger 126 is lowered due to breakage or the like of the second pin 152*a* in a state where the second pin 152*a* is engaged with the second rack 126*b* of the plunger 126 to push up the plunger 126 at the time of the winding operation of the transmission mechanism 115 illustrated in FIG. 12, the stopper pin 152*c* is engaged with the second rack 126*b* of the plunger 126 to stop the lowering of the plunger 126 as illustrated in FIG. 13. Namely, when the plunger 126 is lowered due to breakage or the like of the second pin 152*a* in a state where the second pin 152*a* is pushing up the plunger 126, the second rack 126*b* of the plunger 126 is engaged with the stopper pin 152*c*, and the second rack 126*b* of the plunger 126 gets caught on the stopper pin 152*c*. In this way, it is possible to prevent the plunger 126 from falling.

Next, the winding operation of the transmission mechanism 115 will be described with reference to FIG. 6 to FIG. 10 and FIG. 12.

Figure 9:
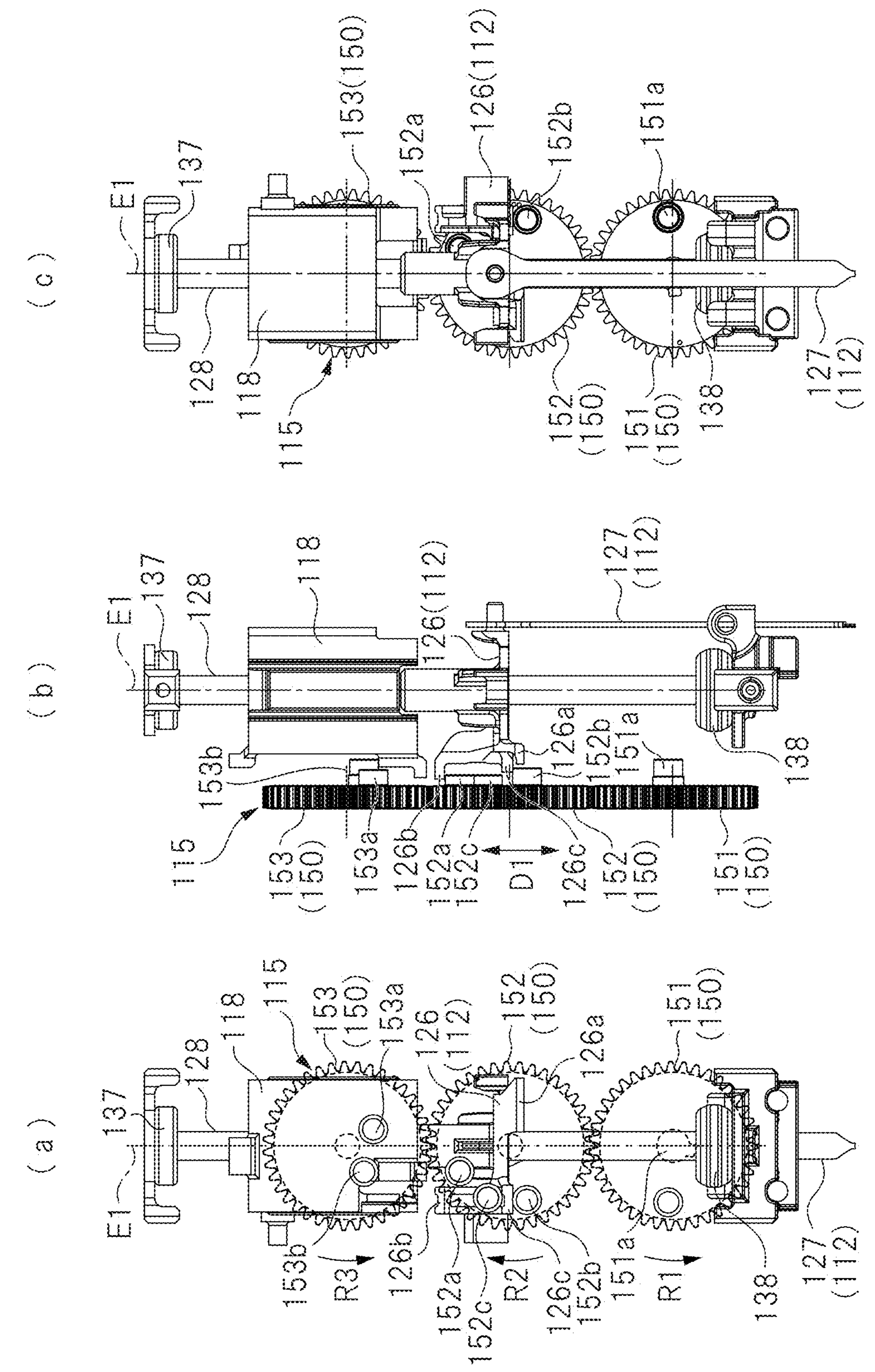
FIG. 9 is a diagram illustrating a state of a striking unit at a standby position in the winding mechanism illustrated in FIG. 2, in which (a) is a back view, (b) is a right side view, and (c) is a front view.
Figure 15:
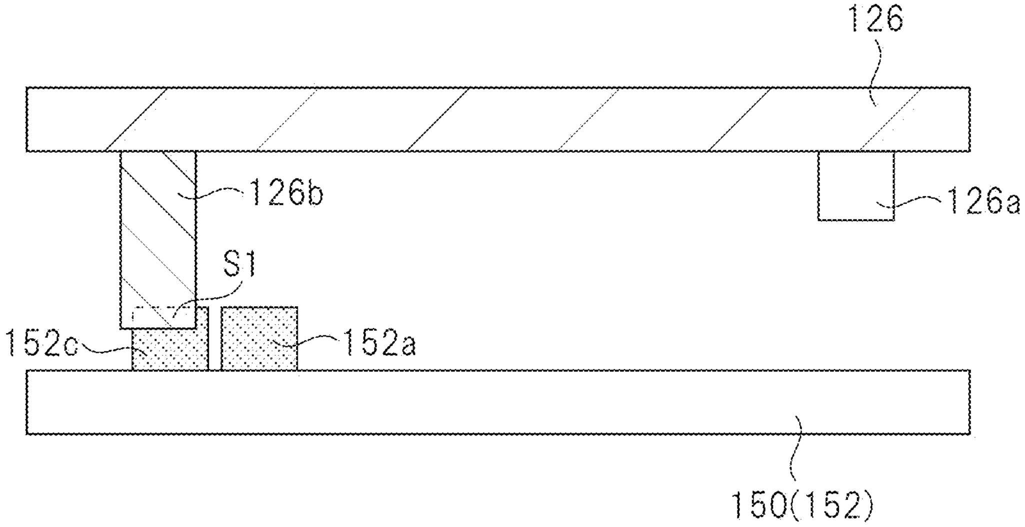
FIG. 15 is a schematic view illustrating a positional relationship between the racks of the plunger and the pins of the gear as viewed in the first direction at the standby position of the winding mechanism illustrated in FIG. 2.

The driving device 100 has the standby state in which the worker does not operate the trigger 142. The state illustrated in FIG. 9 is the standby state. In the standby state, the plunger 126 stands by at the standby position between the top dead center position and the bottom dead center position in the up-down direction D1, and the third rack 126*c* of the plunger 126 is in a state of being supported by the third pin 152*b* such that the plunger 126 does not fall. At the standby position, the driver blade 127 is located on the upper side in the up-down direction D1 relative to the fastener 125 supported by the injection unit 123 illustrated in FIG. 1. Namely, the standby position of the plunger 126 of the present embodiment is a position where the driver blade 127 is disposed on the upper side of the fastener 125, and is set at a high position close to the top dead center. Further, at the standby position, the second rack 126*b* of the plunger 126 does not overlap with the second pin 152*a* as viewed in the up-down direction, and overlaps with the stopper pin 152*c* as viewed in the up-down direction. Namely, as illustrated in FIG. 15, at the standby position, the second rack 126*b* of the plunger 126 does not overlap with the second pin 152*a* as viewed in the up-down direction, and overlaps with the stopper pin 152*c* at a portion S1. Accordingly, when the plunger 126 falls due to breakage or the like of the third pin 152*b* in the standby state, the stopper pin 152*c* is engaged with the second rack 126*b* of the plunger 126, thereby making it possible to stop the lowering of the plunger 126.

In a case where the worker performs the drive operation using the driving device 100 described above, the worker presses the tip of the injection unit 123 illustrated in FIG. 1 to the workpiece W1 and the controller detects that the trigger switch 143 is turned on, and the controller then supplies electric power to the electric motor 114 to rotate the motor shaft 146 forward. The rotational force of the motor shaft 146 is amplified by the decelerator (not illustrated) and transmitted to the first gear 151, and the first gear 151 illustrated in FIG. 9 rotates counterclockwise (rotating direction R1).

Figure 10:
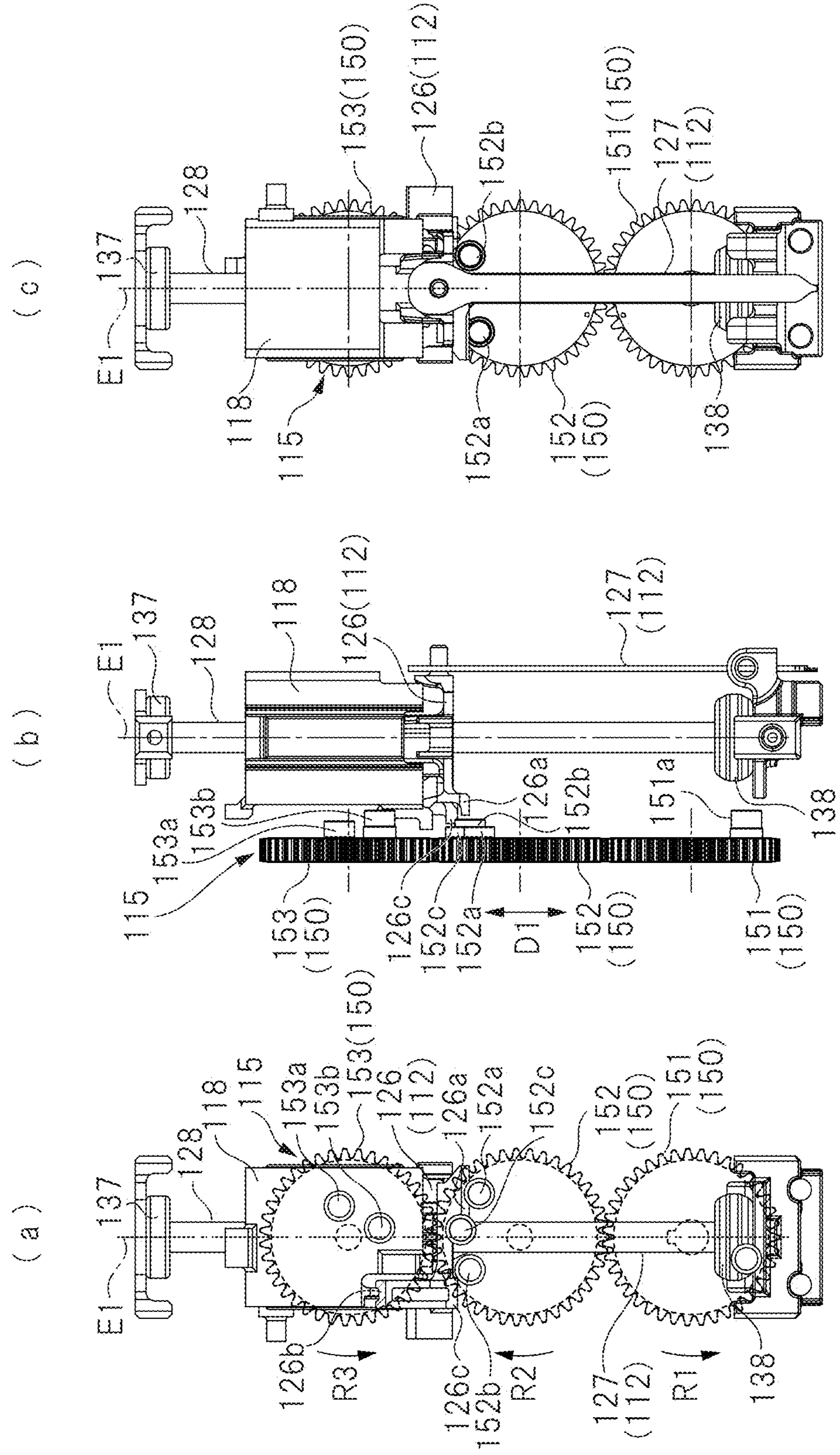
FIG. 10 is a diagram illustrating a state of the winding mechanism illustrated in FIG. 2 at a top dead center position, in which (a) is a back view, (b) is a right side view, and (c) is a front view.

When the first gear 151 rotates counterclockwise, the second gear 152 rotates clockwise (rotating direction R2), and the third gear 153 rotates counterclockwise (rotating direction R3). When the third gear 153 rotates counterclockwise, the plunger 126 operates in the return direction D3 against the biasing force of the spring 136 illustrated in FIG. 1. Namely, as illustrated in FIG. 10, the plunger 126 rises. At this time, the third pin 152*b* is engaged with the third rack 126*c* provided on the plunger 126 to push up the plunger 126, but the stopper pin 152*c* cannot be engaged with the third rack 126*c*. Namely, as illustrated in FIG. 14, since the stopper pin 152*c* has a short length, it is not engaged with the third rack 126*c*.

On the other hand, when the third gear 153 rotates counterclockwise, the counterweight 118 operates in the striking direction D2. Namely, the counterweight 118 is lowered.

Then, when the counterweight 118 is lowered, the plunger 126 rises. Subsequently, the counterweight 118 reaches the bottom dead center, the plunger 126 further rises, and the plunger 126 then reaches the top dead center. In this state, the energy of the spring 136 is maximally accumulated.

When the third rack 126*c* and the third pin 152*b* are disengaged after the plunger 126 reaches the top dead center, the third rack 126*c* is released, and the spring 136 is also released accordingly. When the spring 136 is released, the plunger 126 is lowered by the biasing force of the spring 136. Then, when the plunger 126 starts to be lowered, the counterweight 118 starts to rise by the biasing force of the spring 136.

Figure 6:
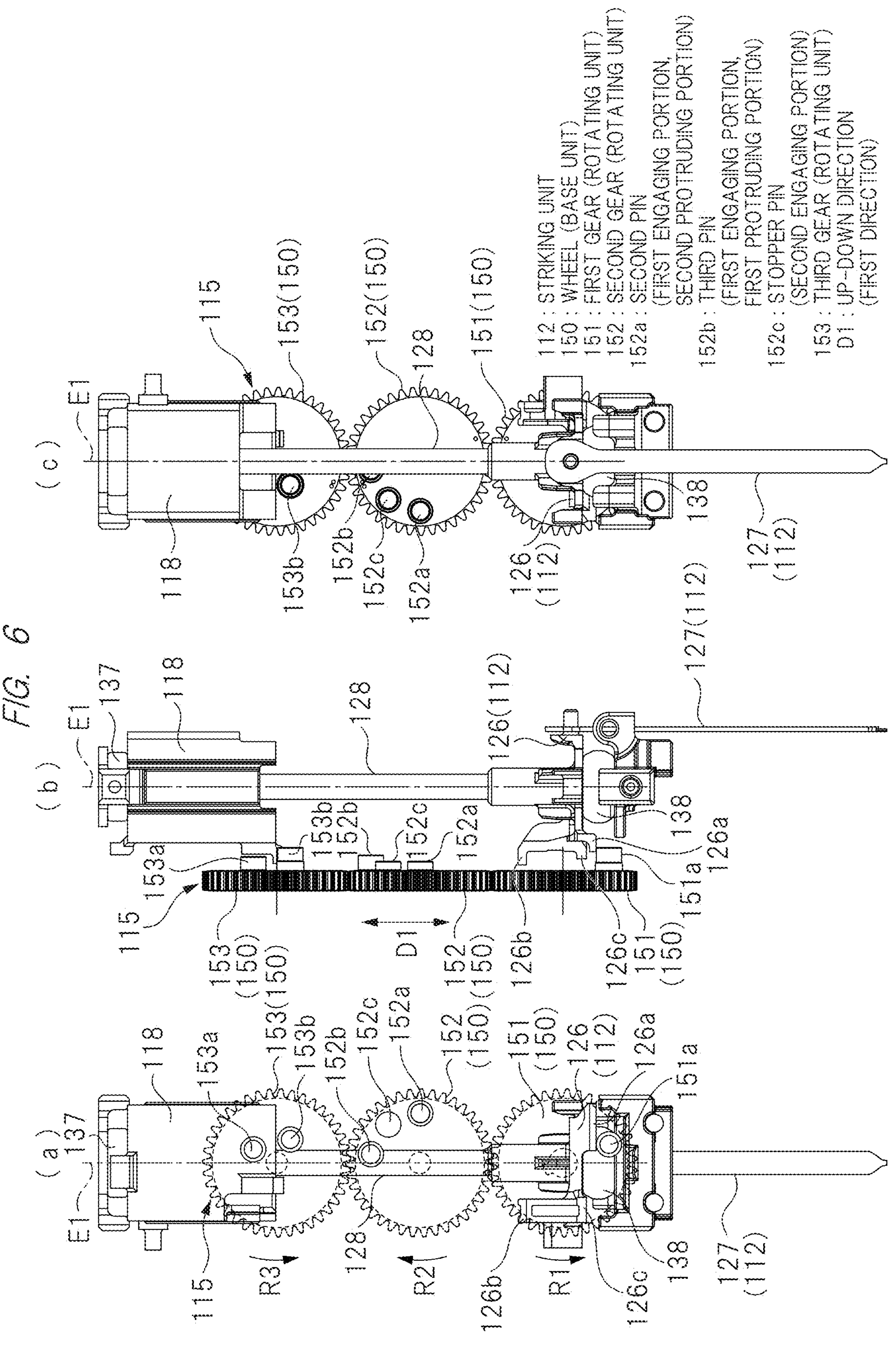
FIG. 6 is a diagram illustrating a state of the winding mechanism illustrated in FIG. 2 at a bottom dead center position, in which (a) is a back view, (b) is a right side view, and (c) is a front view.

When the plunger 126 is lowered, that is, the striking unit 112 is lowered and reaches the position of the bottom dead center illustrated in FIG. 6, the driver blade 127 strikes the fastener 125 located in the injection path 124 illustrated in FIG. 1. In this way, the fastener 125 is driven into the workpiece W1. After the driver blade 127 strikes the fastener 125, the plunger 126 collides with the plunger bumper 138. The plunger bumper 138 absorbs a part of the kinetic energy of the striking unit 112. Also, the counterweight 118 collides with the weight bumper 137. The weight bumper 137 absorbs a part of the kinetic energy of the counterweight 118.

As described above, when the striking unit 112 operates in the striking direction D2 to strike the fastener 125, the counterweight 118 operates in the return direction D3 opposite to the striking direction D2. Therefore, it is possible to reduce the reaction when the striking unit 112 strikes the fastener 125.

Figure 7:
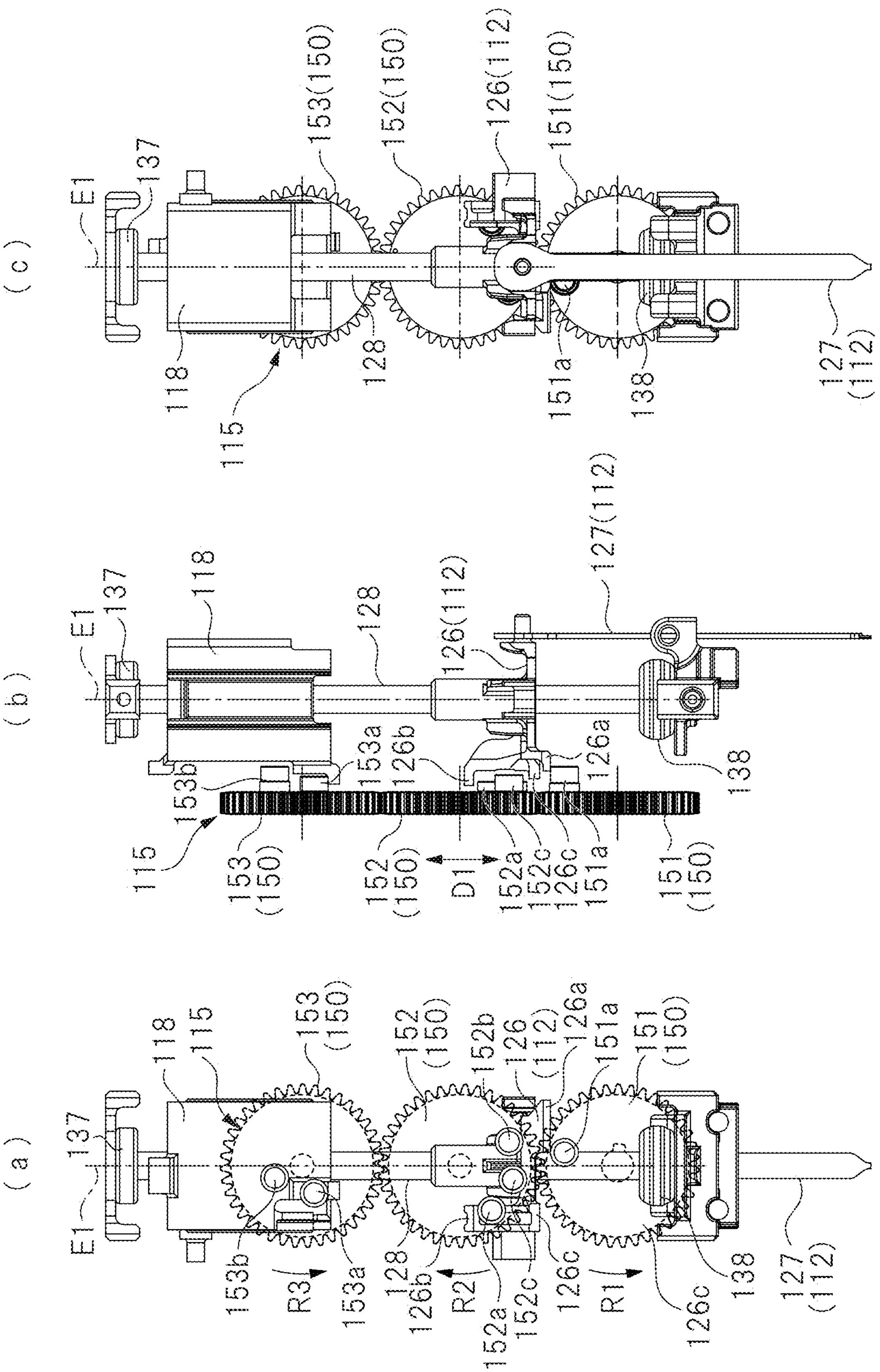
FIG. 7 is a diagram illustrating a state of the winding mechanism illustrated in FIG. 2 at the time of winding, in which (a) is a back view, (b) is a right side view, and (c) is a front view.
Figure 8:
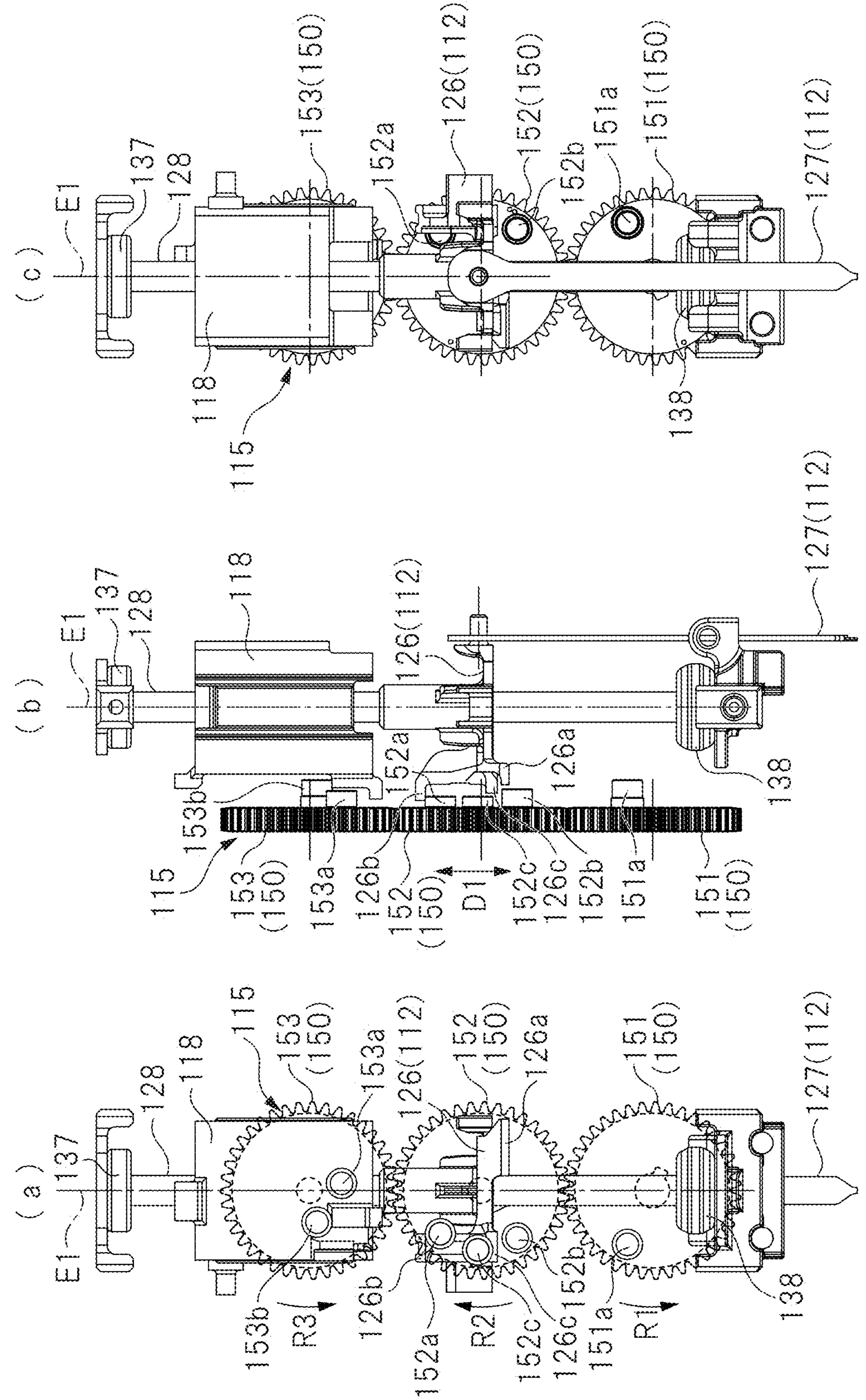
FIG. 8 is a diagram illustrating a state of the winding mechanism illustrated in FIG. 2 at the time of winding, in which (a) is a back view, (b) is a right side view, and (c) is a front view.

As illustrated in FIG. 7, when the first gear 151 rotates counterclockwise (rotating direction R1) after the striking unit 112 strikes the fastener 125, the first rack 126*a* is wound up by the first pin 151*a*, and the plunger 126 rises. Namely, the plunger 126 operates in the return direction D3. When the second gear 152 further rotates clockwise (rotating direction R2) as the plunger 126 rises, the second rack 126*b* is supported by the second pin 152*a* as illustrated in FIG. 12, and the plunger 126 is then pushed up as illustrated in FIG. 8. Thereafter, the pushed-up plunger 126 enters the standby state at the standby position as illustrated in FIG. 9. When the plunger 126 falls due to breakage or the like of the second pin 152*a* in a state where the second pin 152*a* illustrated in FIG. 12 is pushing up the plunger 126, the stopper pin 152*c* is engaged with the second rack 126*b* of the plunger 126, thereby making it possible to stop the lowering of the plunger 126.

As described above, since the stopper pin 152*c* is a short pin, the stopper pin 152*c* is not engaged with the first rack 126*a* and the third rack 126*c* in the winding operation of the plunger 126 (operation of moving the striking unit 112 to the upper side in the up-down direction D1) illustrated in FIG. 6 to FIG. 10. Further, the stopper pin 152*c* is provided so as not to be engaged with the second rack 126*b* at the time of the normal winding operation. Therefore, the winding operation of the plunger 126 illustrated in FIG. 6 to FIG. 10 is not hindered by the stopper pin 152*c*.

In the driving device 100 of the present embodiment, the stopper pin 152*c* having a short length (small protrusion amount) is provided on the second gear 152. Therefore, when the plunger 126 falls due to breakage or the like of the third pin 152*b* at the standby position of the plunger 126, the stopper pin 152*c* is engaged with the second rack 126*b* of the plunger 126, thereby making it possible to stop the lowering of the plunger 126. Alternatively, when the plunger 126 falls due to breakage or the like of the second pin 152*a* in a state where the second pin 152*a* is pushing up the plunger 126, the stopper pin 152*c* is engaged with the second rack 126*b* of the plunger 126, thereby making it possible to stop the lowering of the plunger 126. In this way, it is possible to reduce the occurrence of idling strike in which the plunger 126 accidentally moves to the bottom dead center. Since the occurrence of the idling strike may lead to breakage of the plunger 126, the durability of the driving device 100 can be improved by reducing the occurrence of the idling strike.

In addition, since the lowering of the plunger 126 can be stopped by the stopper pin 152*c* even when the plunger 126 falls at the standby position of the plunger 126, the standby position of the plunger 126 can be set to a high position close to the top dead center. In this way, the time until the plunger 126 reaches the top dead center from the standby position when the worker operates the trigger 142 can be shortened, and the response of the driving device 100 when the worker operates the trigger 142 can be improved.

In addition, the stopper pin 152*c* and the second pin 152*a* are pins having the same shape and the same length (protrusion amount). Then, by providing the stopper pin 152*c* on the second gear 152, the gear and the pin can be used in common. Namely, components can be used in common.

Next, a modification of the present embodiment will be described.

Figure 16:
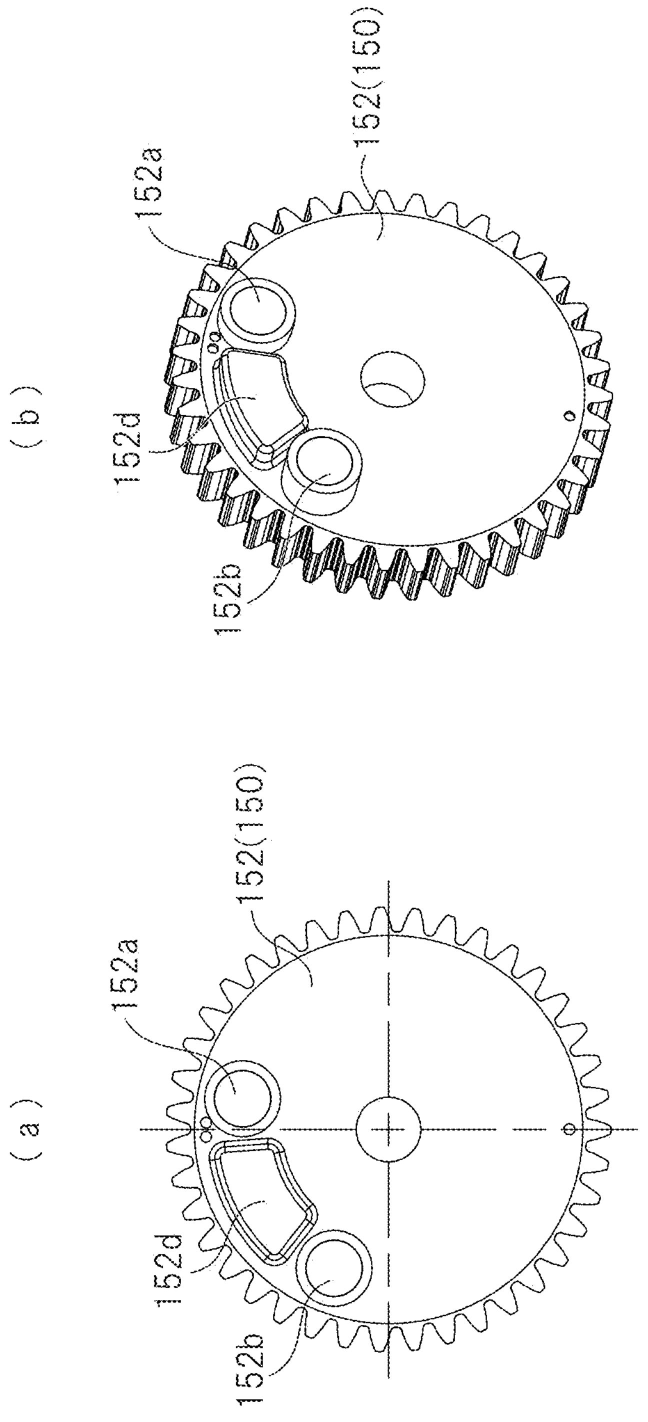
FIG. 16 is a diagram illustrating a structure of a pin wheel according to a modification of the embodiment of the present invention, in which (a) is a front view and (b) is a perspective view.

FIG. 16 illustrates a structure of the second gear 152 (wheel 150) according to the modification of the present embodiment. Namely, a protruding portion 152*d* protruding in an arc shape is provided as the second engaging portion at a position between the second pin 152*a* and the third pin 152*b* of the second gear 152. The arc-shaped protruding portion 152*d* can be formed integrally with the second gear 152. Also in the case of using the second gear 152 provided with the arc-shaped protruding portion 152*d*, the durability of the driving device 100 can be improved, and the response of the driving device 100 can be improved. In addition, since the arc-shaped protruding portion 152*d* can be formed integrally with the second gear 152, the number of parts can be reduced as compared with the case where the stopper pin 152*c* is provided on the second gear 152 as the second engaging portion.

If the second pin 152*a* and the protruding portion 152*d* are formed as an integrated protruding portion, the protruding portion is used for winding up the plunger 126, and thus there is a risk that fatigue is accumulated to degrade the durability. In order to ensure sufficient strength to receive an impact when the plunger 126 falls, the second pin 152*a* and the protruding portion 152*d* are desirably formed apart from each other so as to protrude independently, instead of being formed as an integrated protruding portion protruding from the second gear 152.

The present invention is not limited to the above embodiment, and various modifications can be made within the range not departing from the gist of the present invention. For example, in the above embodiment, the coil spring type driving device 100 has been described, but the driving device 100 may be a gas spring type that lowers the striking unit by means of compressed air.

REFERENCE SIGNS LIST

100 driving device (working machine)
111 housing
112 striking unit
113 magazine
114 electric motor (driving source)
115 transmission mechanism
116 control unit
117 battery pack
118 counterweight
119 body
120 handle
121 motor case
122 attaching unit
123 injection unit
124 injection path
125 fastener
126 plunger
126*a* first rack
126*b* second rack (first engaged portion)
126*c* third rack (second engaged portion)
127 driver blade
128 guide shaft
129 top cover
130 bottom holder
131 guide bar
132 latch
136 spring (biasing unit)
137 weight bumper
138 plunger bumper
142 trigger (operation unit)
143 trigger switch
146 motor shaft
148 input element
149 output element
150 wheel (base unit)
151 first gear (rotating unit)
151*a* first pin
152 second gear (rotating unit)
152*a* second pin (first engaging portion, second protruding portion)
152*b* third pin (first engaging portion, first protruding portion)
152*c* stopper pin (second engaging portion)
152*d* protruding portion (second engaging portion)
153 third gear (rotating unit)
153*a* fourth pin
153*b* fifth pin
D1 up-down direction (first direction)
E1 center line
R1, R2, R3 rotating direction
W1 workpiece

The invention claimed is:

1. A working machine comprising:

a driving source;

a striking unit configured to strike a fastener by moving downward along an up-down direction;

a biasing unit configured to bias the striking unit downward along the up-down direction; and a rotating unit configured to be rotated by a driving force of the driving source, thereby moving the striking unit upward along the up-down direction, wherein the rotating unit includes a base unit and a plurality of engaging portions provided on the base unit so as to be engageable with the striking unit, wherein the rotating unit performs a lifting operation to move the striking unit from a standby position between a top dead center position and a bottom dead center position to the top dead center position, wherein the plurality of engaging portions include:

a first engaging portion that is engaged with the striking unit during the lifting operation; and a second engaging portion that is not engaged with the striking unit during the lifting operation, and wherein, when the striking unit is at the standby position, the second engaging portion overlaps with the striking unit in the up-down direction and is disposed below the first engaging portion in the up-down direction.

2. The working machine according to claim 1, wherein the second engaging portion is engaged with the striking unit when the first engaging portion is disengaged from the striking unit and the striking unit moves downward along the up-down direction.

3. The working machine according to claim 2, further comprising an operation unit that is operated by a worker, wherein the first engaging portion includes a first protruding portion and a second protruding portion different from the first protruding portion, and wherein the striking unit is engaged with the first protruding portion in a standby state in which the operation unit is not operated.

4. The working machine according to claim 3, wherein the standby position at which the striking unit is disposed in the standby state is between the top dead center position and the bottom dead center position in movement of the striking unit along the up-down direction.

5. The working machine according to claim 4, further comprising an injection unit configured to support the fastener to be struck by the striking unit, wherein, at the standby position, the striking unit is located on an upward side along the up-down direction relative to the fastener supported by the injection unit.

6. The working machine according to claim 4, wherein the striking unit includes a first engaged portion that is engaged with the second protruding portion, and wherein, at the standby position, the first engaged portion does not overlap with the second protruding portion as viewed in the up-down direction and overlaps with the second engaging portion as viewed in the up-down direction.

7. The working machine according to claim 6, wherein the first protruding portion is engaged with a second engaged portion provided on the striking unit when the striking unit is moved upward along the up-down direction, and wherein the second engaging portion is not engageable with the second engaged portion.

8. The working machine according to claim 3, wherein the second engaging portion is disposed on a rear side of the second protruding portion in a rotating direction of the rotating unit.

9. The working machine according to claim 3, wherein the second engaging portion and the second protruding portion have the same shape.

10. A working machine comprising:

a driving source;

a striking unit configured to be able to strike a fastener by moving downward along an up-down direction;

a biasing unit configured to bias the striking unit downward along the up-down direction; and a rotating unit configured to be rotated by a driving force of the driving source, thereby moving the striking unit upward along the up-down direction, wherein the rotating unit includes a base unit and first and second engaging portions provided on the base unit so as to be engageable with the striking unit, wherein the rotating unit performs a lifting operation to move the striking unit to a top dead center position by rotating in a state where the first engaging portion engages the striking unit, wherein the rotating unit allows the striking unit to strike the fastener by disengaging the first engaging portion from the striking unit after the striking unit reaches the top dead center position, and wherein, during the lifting operation, the second engaging portion does not engage the striking unit, and, when the first engaging portion is disengaged from the striking unit before the striking unit reaches the top dead center position during the lifting operation, the second engaging portion then engages the striking unit.

* * * * *